Feb. 11, 1969  A. R. PERINI  3,426,912
RACK CONVEYING SYSTEM
Filed March 7, 1966

Anthony R. Perini
INVENTOR.

BY *Clarence A. O'Brien*
*and Harvey B. Jackson*
Attorneys

Anthony R. Perini
INVENTOR.

Feb. 11, 1969
A. R. PERINI
3,426,912
RACK CONVEYING SYSTEM
Filed March 7, 1966
Sheet 3 of 3
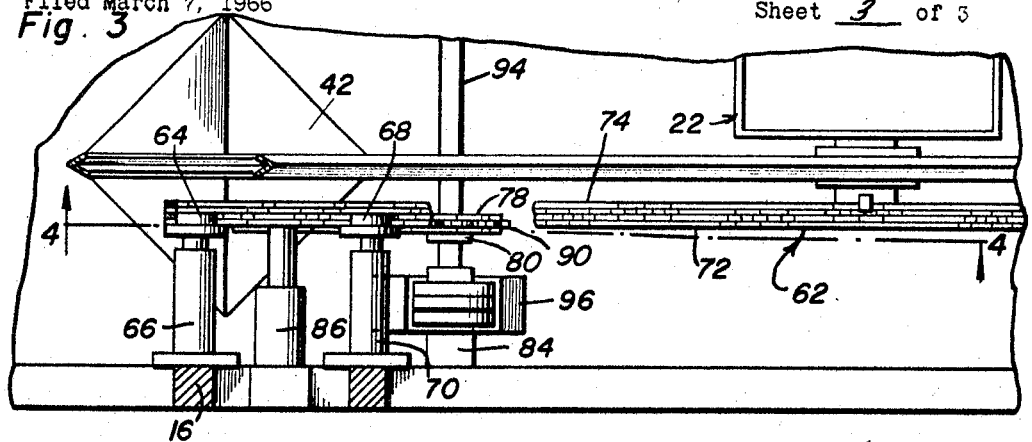
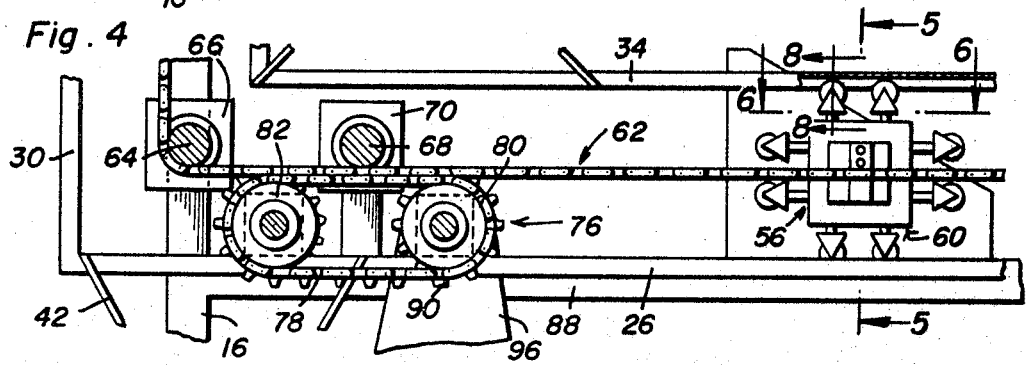
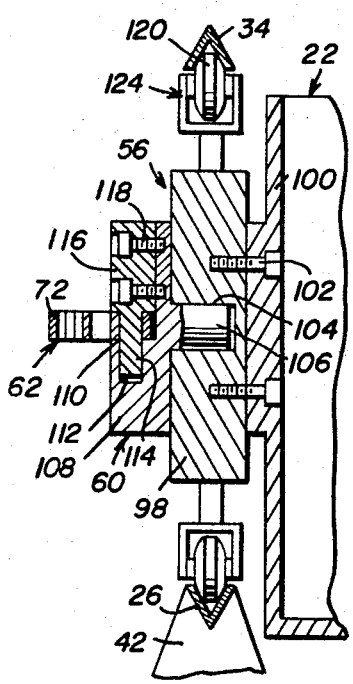
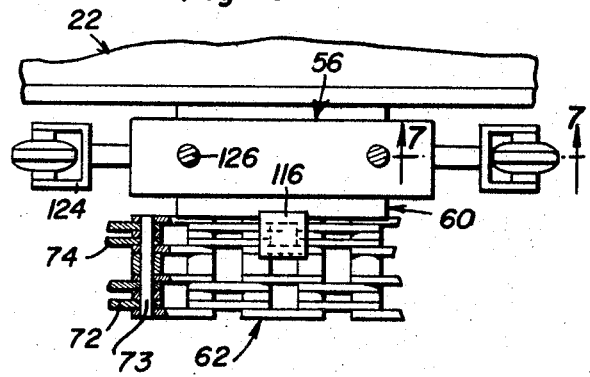
Anthony R. Perini
INVENTOR.
BY Clarence A'Brien
and Harvey B. Jacobson
Attorneys United States Patent Office 3,426,912
Patented Feb. 11, 1969

3,426,912
RACK CONVEYING SYSTEM
Anthony R. Perini, 6 Wall St.,
New Bedford, Mass. 02740
Filed Mar. 7, 1966, Ser. No. 532,312
U.S. Cl. 211—121          21 Claims
Int. Cl. A47f 5/03, 3/08

ABSTRACT OF THE DISCLOSURE

A carriage is conveyed by a flexible chain past a direction changing location of a track assembly such as a right angle corner. The track assembly guides the carriage along a path which deviates from the flexible chain supported by an idler wheel at said corner without changing the orientation of the carriage relative to the track assembly by continuous engagement of the track members at all times with yieldable guide wheels mounted by the carriage.

This invention relates to movable display or article carrying racks and more particularly to the rack supporting and conveying apparatus.

The system of the present invention is applicable to racks of different types and sizes including for example relatively small racking devices such as those of cabinet size as well as relatively large racking systems capable of being utilized in a public library for example. Regardless of the size of the racking system, the present invention contemplates the fixed mounting of a continuous track assembly defining an endless path along which rack members are conveyed by endless conveyor chains or belts from which the rack members are pivotally suspended. In accordance with the present invention, the rack members are supported by carriage having guiding facilities engageable with the track assembly which continuously stabilize the rack in its suspended position even where the conveyor chain deviates from direction changing portions of the path defined by the track assembly. In this fashion, the rack members and supporting carriages are prevented from "jumping" the track and avoid binding of the conveyor despite the use of a less expensive construction for the track assembly.

It is therefore a primary object of the present invention to provide a racking system wherein rack members are conveyed along a path defined by track members which deviate at certain direction changing locations from the path along which the rack members are conveyed by the flexible conveyor member.

An additional object of the present invention is to provide a racking system wherein a pair of parallel spaced track members are continuously engaged by guiding facilities on a rack supporting carirage so as to maintain the rack member orientated relative to the path defined by the track members despite its deviation at certain locations from the path established by the conveyor member itself.

An additional object of the present invention is to provide a racking system having a track assembly forming a continuous path such as a rectangle the corners of which necessarily deviate from the path along which a rack supporting carriage is conveyed by an endles conveyor member supported by idler wheels adjacent the corners of the rectangular path. The rack supporting carriages although supported in gravitationally suspended positions from the flexible conveyor members are continuously guided by the track assembly which maintains substantially the same suspended orientation of the carriages relative to the rectangular path defined by the track assembly even where the path of the conveyor members deviates from the rectangular path of the track assembly.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged partial sectional view taken substantially through a plane indicated by section line 3—3 in FIGURE 2.

FIGURE 4 is a sectional view taken substantially through a plane indicated by section line 4—4 in FIGURE 3.

FIGURE 5 is an enlarged partial sectional view taken substantailly through a plane indicated by section line 5—5 in FIGURE 4.

FIGURE 6 is an enlarged partial sectional view taken substantially through a plane indicated by section line 6—6 in FIGURE 4.

Figure 1:
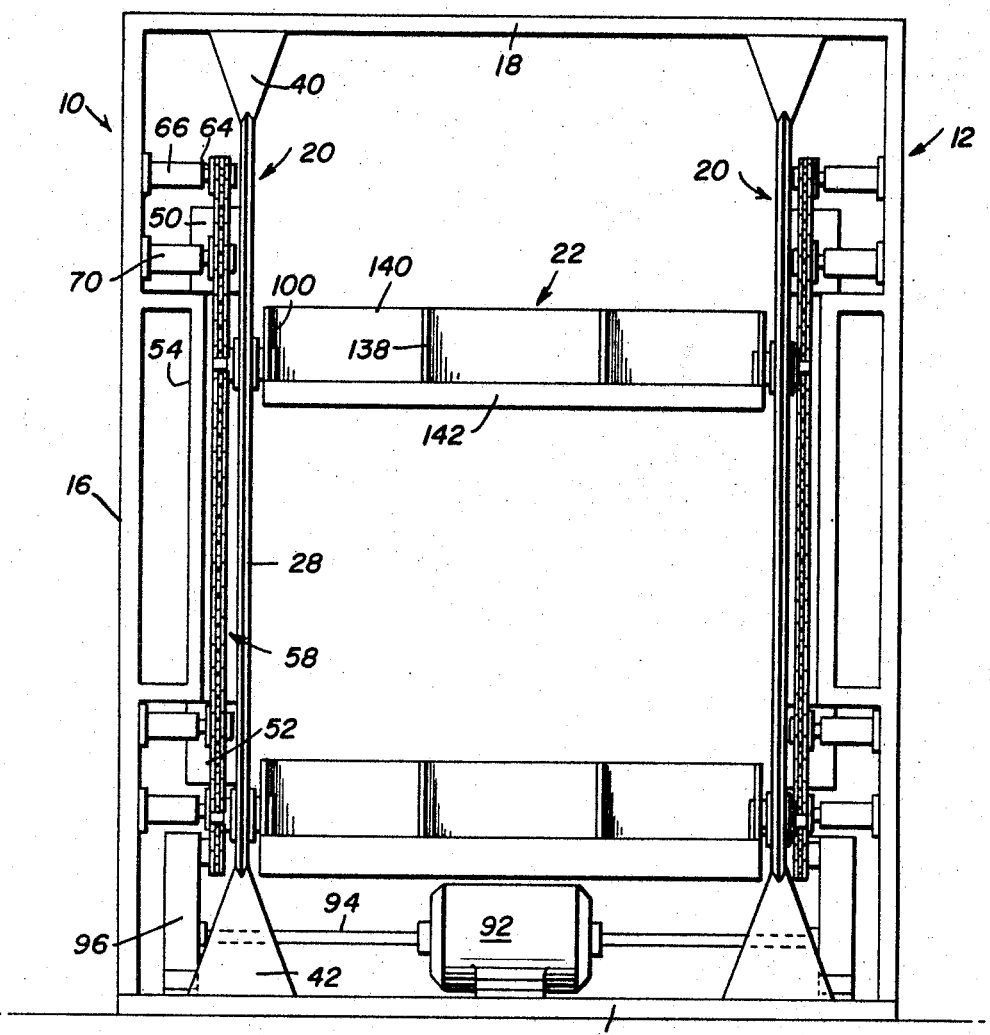
FIGURE 1 is a front elevational view of one embodiment of a racking system constructed in accordance with the present invention.
Figure 2:
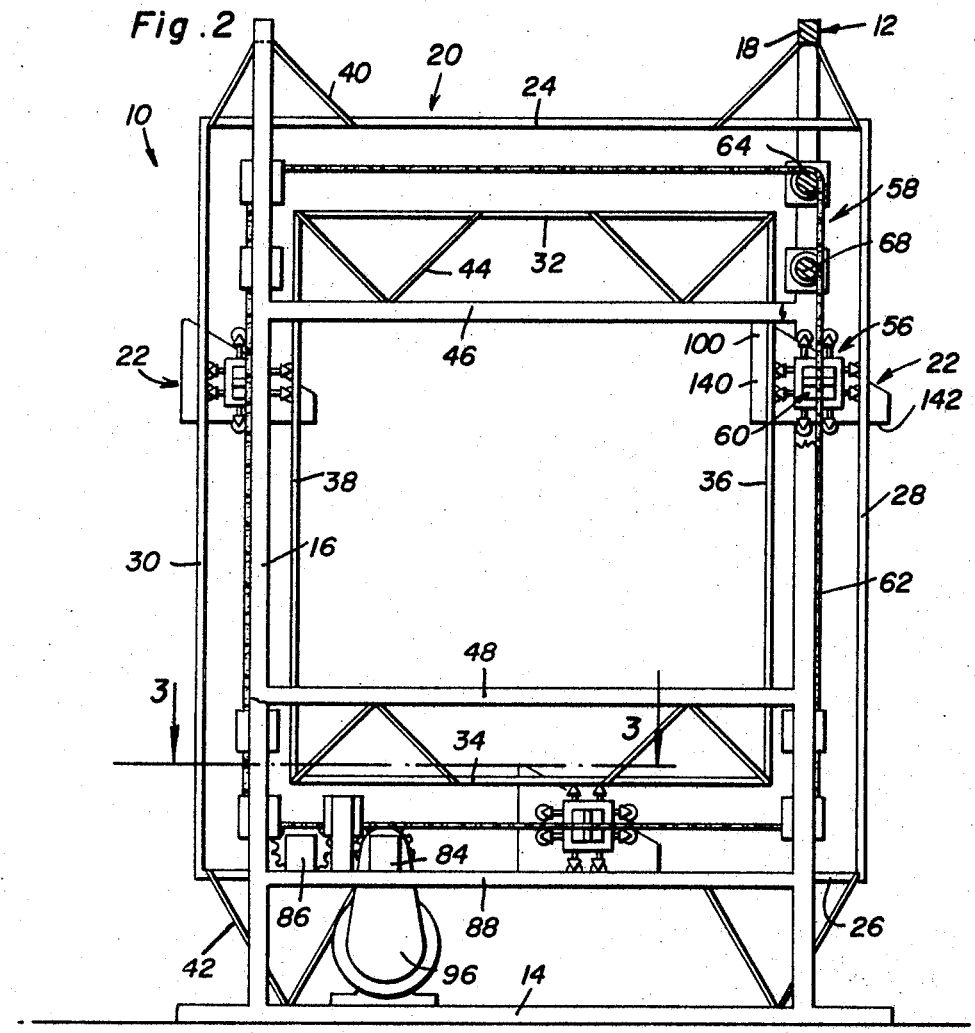
FIGURE 2 is a side elevational view of the constructional embodiment shown in FIGURE 1.

Referring now to the drawings in detail, FIGURES 1 and 2 illustrate a racking system generally denoted by reference numeral 10 which is fixedly supported at any desired location by means of a frame assembly generally referred to by reference numeral 12. The frame assembly includes a base portion 14 on which four vertical frame posts 16 are supported, the posts being interconnected above the base portion by top frame stringers 18. It will of course be appreciated that the actual frame assembly may vary in accordance with installation requirements and that the frame assembly may be housed within a cabinet for example. The frame assembly is designed to provide adequate support for a pair of parallel spaced track assemblies 20 between which a plurality of rack members 22 are supported for movement generally along a continuous path defined by the track assemblies which in the illustrated embodiment is a rectangle. The track assemblies are therefore identical in construction and each includes an outer track consisting of upper and lower sections 24 and 26 interconnecting the side sections 28 and 30. The inner track is similarly formed from upper and lower track sections 32 and 34 interconnecting the side track sections 36 and 38. The upper track sections 24 are suspended from the top frame members 18 by the truss elements 40 while the lower track sections 26 are supported above the base portion 14 by the brace elements 42. The upper track sections 32 of the inner track on the other hand are supported by the brace elements 44 above the cross frame members 46 while the lower track sections 34 of the inner track are suspended from the cross frame members 48. Additional support for the track sections are also provided by the truss elements 50 and 52 connected to the inwardly projecting side frame supports 54. The inner and outer tracks are thereby fixedly supported in constant parallel spaced relation to each other to define a rectangular path along which rack supporting carriages 56 are conveyed. Accordingly, each rack member 22 is supported between a pair of carriages 56 associated with the parallel spaced track assemblies 20.

Each of the carriages 56 is connected to a conveyor assembly generally referred to by reference numeral 58 for movement along the continuous rectangular path associated with the track assemblies. Accordingly, two conveyor assemblies 58 are respectively associated with the track assemblies 20 and each carriage 56 is provided with a coupling assembly 60 by means of which the carriage is pivotally suspended from the conveyor. Each conveyor assembly includes a flexible, endless conveyor chain 62 which is supported in a position parallel to the rectangular path defined by the track assemblies, deviating from said rectangular path only adjacent the corners of the rectangle at which locations the conveyor chain is entrained about the idler sprocket wheels 64. Each of the corner sprocket wheels 64 is rotatably mounted by a supporting journal 66 secured to the side frame posts 16 of the frame assembly from which they extend inwardly. Additional idler sprocket wheels 68 may also engage the sprocket chain adjacent to the corners of the rectangular path, the sprocket wheels 68 being rotatably mounted by the journal assemblies 70 secured to the frame assembly. As more clearly seen in FIGURE 6, the conveyor chain 62 is composed of a plurality of link sections pivotally interconnected by laterally elongated link pins 73, each link section including two laterally spaced pairs of chain links 72 and 74. The idler sprocket wheels 64 and 68 are engaged only with the laterally outer chain links 72, for support of the conveyor chain in the approximately rectangular configuration without interfering with the coupling assemblies 60 secured to the laterally inner chain links 74.

As more clearly seen in FIGURE 4, each conveyor chain 62 is driven by a drive assembly 76 including an endless drive chain 78 entrained about a drive sprocket wheel 80 and an idler sprocket wheel 82. The sprocket wheels 80 and 82 are respectively mounted by spaced journal assemblies 84 and 86 secured to the cross frame member 88 as more clearly seen in FIGURE 2 so that the upper run of the drive chain 78 underlies the laterally outer chain links 72 of the conveyor chain 62. The drive projections 90 on the drive chain therefore engage the conveyor chain 62 between the chain links in order to impart movement to the conveyor chain. Both of the drive assemblies 76 are driven by a drive motor 92 mounted on the base portion 14 of the frame assembly between the track assemblies. The output shaft 94 of the drive motor extends axially from both ends of the motor and is drivingly connected by the gear assemblies 96 to the drive sprockets 80 associated with each of the drive assemblies 76.

Referring now to FIGURES 5 and 6, it will be noted that the carriages 56 include rectangular blocks 98 secured to the sides 100 of the rack member 22 by means of fasteners 102. A journal bore 104 is formed in each carriage block 98 in order to receive a pivot stub shaft 106 projecting from the coupling base member 108 along an axis intersecting the path of the track assembly. The coupling base member includes a supporting surface 110 offset from the axis of the pivot shaft 106 for receiving a portion of the conveyor chain 62 in alignment with the axis of the pivot shaft. A receptacle bore 112 is formed in the conveyor chain receiving surface 110 in order to receive an insert projection 114 between the links 74 of the conveyor chain, the projection 114 being formed on a fastener element 116 in order to clamp the conveyor chain onto the coupling base 108. Accordingly, the fastener element 116 is removably secured to the coupling base by means of the fasteners 118. It will therefore be apparent that the coupling assemblies 60 and carriages 56 will support the rack members 22 on the conveyor chains 62 in gravitationally suspended positions. As each rack member travels along the path of the conveyor chains simultaneously driven by the drive motor 92, they will assume the same orientation when travelling along both the vertical and horizontal runs of the conveyor chains which are disposed substantially parallel to the rectangular path defined by the track assemblies 20 as aforementioned.

Figure 8:
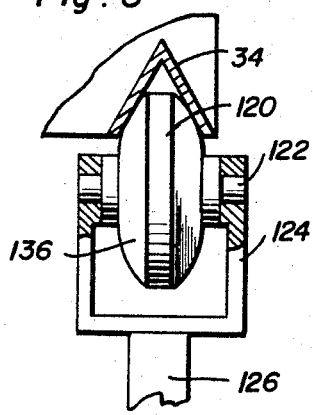
FIGURE 8 is an enlarged partial sectional view taken substantailly through a plane indicated by section line 8—8 in FIGURE 4.
Figure 7:
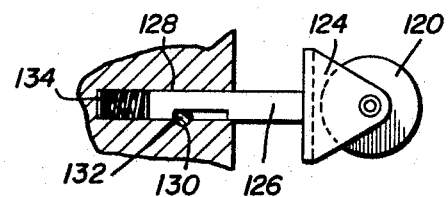
FIGURE 7 is an enlarged partial sectional view taken substantailly through a plane indicated by section line 7—7 in FIGURE 6.

While the rack assemblies are being conveyed by the conveyor chains, they are stabilized in their suspended positions by guiding means which continuously engage both the outer and inner tracks of the track assemblies. Referring therefore to FIGURES 4 through 8, it will be observed that the inner and outer tracks of the track assemblies are V-shaped in cross-section opening toward each other so as to receive a plurality of guide wheels 120 which project in different directions parallel to and perpendicular to the straight side segments of the rectangular path defined by the track assemblies. Each carriage block 98 is therefore square in shape so that two guide wheels 120 as shown in the illustrated embodiment may project from each of the four sides thereof. Each guide wheel is rotatably mounted by an axle 122 on an axle bracket 124 which in turn is slidably mounted by the carriage block. Toward this end, each axle bracket is provided with a shaft 126 received within a bore 128 formed in the carriage block. Bores 130 smaller in diameter than the bores 128 are also formed in the carriage block intersecting each of the bores 128 so as to receive a limit pin 132 as shown in FIGURE 7. The limit pin 132 therefore extends through each of the bores 128 in order to limit and guide movement of the bracket shaft 126 both inwardly and outwardly. A spring 134 is also seated within each bore 128 for outwardly biasing the guide wheel into engagement with one of the track sections. It will therefore be apparent that guide wheels 120 will always be engaged with both of the tracks regardless of the location of the carriage. Also, as shown in FIGURE 8, the sides 136 of each guide wheel converge radially outwardly and may be formed with a curvature so as to establish rolling contact with the V-shaped surfaces of the track sections. The guide wheels will therefore insure that the carriages follow the rectangular path of the track assemblies in the same angular position relative to the frame assembly even when the path of movement thereof deviates from the rectangular path of the track assemblies particularly at the corners of the rectangular path where the conveyor chains assume the curvature of the supporting idler sprocket wheels 64.

From the foregoing description, it will be apparent that the apparatus described will carry or display articles within the rack members 22 when travelling along the straight segment of the path defined by the vertical track sections 28 and 36. In the illustrated embodiment, the rack members are provided with partition walls 138 spaced from the side walls 100 of the rack member and secured to the back wall 140 and bottom wall 142. The partition walls 138 could also serve as shelves should the apparatus 10 be turned on a side for horizontal movement of the rack members along the track sections 28 and 36. It will of course be appreciated that other shapes and configurations for the rack members may be adopted. Of particular significance however, is the continuous guiding facilities provided for the rack members by the carriage assemblies 58 while being pivotally supported by the coupling assemblies 60 from the conveyor chains 62. The guiding wheels 120 thus maintain the orientated positions of the rack members with respect to the rectangular path established by the track assemblies even where the rectangular path deviates from the path of the conveyor chains. The necessity for curved track sections may therefore be eliminated and binding of the conveying chains avoided.

The foregoing is considered as illustratvie only of the principles of the invention. Further, since numerous modifications and changes will readily occur to those skilled in the art, it is not desired to limit the invention to the exact construction and operation shown and described, and accordingly all suitable modifications and equivalents may be restored to falling within the scope of the invention as claimed.

What is claimed as new is as follows:

1. A movable rack assembly comprising, a frame, a pair of substantially parallel spaced tracks mounted on the frame defining a continuous path having substantially straight segments intersecting at corner points, an endless flexible conveyor, supporting wheel means rotatably mounted by said frame adjacent to said corner points for supporting the conveyor in constant parallel spaced relation to said path except at said corner points, a rack supporting carriage, coupling means connecting the carriage to the conveyor for movement of the carriage by the conveyor without change in the orientation of the carriage relative to the frame, and guide means mounted by the carriage and engageable at all times with said pair of tracks for continuously guiding movement of the carriage.

2. The combination of claim 1 including an endless drive chain operatively mounted by the frame and having a portion drivingly engaged with the conveyor between two adjacent corner points of said path for imparting movement to the conveyor.

3. The combination of claim 2 wherein said conveyor comprises, a plurality of laterally spaced pairs of chain links and link pins interconnecting said spaced pairs of chain links for movement together as a single link chain, one of said pairs of chain links being engaged by the supporting wheel means and another of said pairs of chain links being connected to the coupling means in laterally spaced relation to the wheel means.

4. The combination of claim 3 wherein said coupling means comprises, a coupling base pivotally connected to the carriage about an axis intersecting said path, said coupling base having a receiving surface offset from the axis supporting a pair of said chain links thereon in alignment with said path and a fastener element removably secured to the coupling base and extending between said pair of chain links into a receptacle formed in the receiving surface.

5. The combination of claim 4 wherein said guide means comprises, a plurality of guide wheels projecting from the carriage in directions parallel to and perpendicular to each of the straight segments of said path, means rotatably mounting said guide wheels for engagement with both of said tracks by at least two of the guide wheels at any location of the carriage along the path.

6. The combination of claim 5 wherein said pair of tracks are V shaped in cross-section opening toward each other for receiving the guide wheels therebetween, each of said guide wheels having an annular rim portion formed by track engaging surfaces converging radially outward.

7. The combination of claim 6 wherein said rotatable mounting means for each of the guide wheels comprises, an axle bracket carrying the guide wheel, means slidably mounting the axle bracket in the carriage for limited movement relative thereto, and means biasing the bracket outwardly from the carriage for yieldable engagement of the guide wheel with one of the tracks.

8. The combination of claim 1 wherein said conveyor comprises, a plurality of laterally spaced pairs of chain links, and link pins interconnecting said spaced pairs of chain links for movement together as a single link chain, one of said pairs of chain links being engaged by the supporting wheel means and another of said pairs of chain links being connected to the coupling means in laterally spaced relation to the wheel means.

9. The combination of claim 8 wherein said coupling means comprises, a coupling base pivotally connected to the carriage about an axis intersecting said path, said coupling base having a receiving surface offset from the axis supporting a pair of said chain links thereon in alignment with said path and a fastener element removably secured to the coupling base and extending between said pair of chain links into a receptacle formed in the receiving surface.

10. The combination of claim 1 wherein said guide means comprises, a plurality of guide wheels projecting from the carriage in directions parallel to and perpendicular to each of the straight segments of said path, means rotatably mounting said guide wheels for engagement with both of said tracks by at least two of the guide wheels at any location of the carriage along the path.

11. The combination of claim 10 wherein said rotatable mounting means for each of the guide wheels comprises, an axle bracket carrying the guide wheel, means slidably mounting the axle bracket in the carriage for limited movement relative thereto, and means biasing the bracket outwardly from the carriage for yieldable engagement of the guide wheel with one of the tracks.

12. The combination of claim 1, wherein said pair of tracks are V shaped in cross-section opening toward each other for receiving the guide means therebetween.

13. The combination of claim 12 wherein said guide means comprises, a plurality of guide wheels projecting from the carriage in directions parallel to and perpendicular to each of the straight segments of said path, means rotatably mounting said guide wheels for engagement with both of said tracks by at least two of the guide wheels at any location of the carriage along the path.

14. In a rack conveying assembly, a frame, a pair of substantially parallel spaced tracks mounted on the frame defining a continuous path having substantially straight segments intersecting at corner points, an endless flexible conveyor chain, sprocket wheels rotatably mounted by said frame adjacent to said corner points supporting the conveyor chain in constant parallel spaced relation to said path except at said corner points, a rack supporting carriage, coupling means pivotally suspending the carriage from the conveyor chain, and guide means mounted by the carriage and projecting therefrom in directions parallel to and perpendicular to the straight segments of said path for engaging both tracks at all locations along said path.

15. The combination of claim 14 wherein said guide means includes a plurality of guide wheels, each of said guide wheels having an annular rim portion formed by track engaging surfaces converging radially outward.

16. The combination of claim 15 wherein said coupling means comprises, a coupling block pivotally connected to the carriage about an axis intersecting the path, and removable fastener means locking the conveyor chain to the coupling block in laterally spaced relation to the sprocket wheels.

17. The combination of claim 14 wherein said coupling means comprises, a coupling block pivotally connected to the carriage about an axis intersecting the path, and removable fastener means locking the conveyor chain to the coupling block in laterally spaced relation to the sprocket wheels.

18. In combination with a track assembly including a pair of continuous members fixedly spaced apart by a constant amount in a common plane to define a predetermined path having a direction changing location, a carriage, flexible conveyor means connected to the carriage for movement thereof along a path deviating from said predetermined path at said direction changing location, and guide means mounted by the carriage for continuous engagement with the track assembly maintaining the carriage fixedly orientated relative to the track assembly while passing said direction changing location along the path.

19. The combination of claim 18 wherein said guide means comprises a plurality of guide wheels projecting from the carriage in different directions, means rotatably mounting the guide wheels for engagement of both of the members of the track assembly by at least two of the guide wheels at all locations of the carriage along the path of the flexible conveyor means.

20. In combination with a track assembly defining a predetermined path and a carriage, flexible conveyor means connected to the carriage for movement thereof along a path deviating from said predetermined path at spaced locations, and guide means mounted by the carriage for continuous engagement with the track assembly maintaining the carriage fixedly oriented relative to said predetermined path of the track assembly, said guide means comprising a plurality of guide wheels projecting from the carriage in different directions, means rotatably mounting the guide wheels for engagement of the track assembly by at least two of the guide wheels at all locations of the carriage along the path of the flexible conveyor means, said rotatable mounting means for each of the guide wheels comprising, an axle bracket carrying the guide wheel, means slidably mounting the axle bracket in the carriage for limited movement relative thereto, and means biasing the bracket outwardly from the carriage for yieldable engagement of the guide wheel with the track assembly.

21. A movable rack assembly comprising a frame, a pair of continuous tracks mounted on the frame and spaced throughout in a common plane to define a continuous path therebetween having abrupt direction changing portions, a flexible conveyor, supporting wheel means rotatably mounted by said frame adjacent to said direction changing portions for supporting the conveyor in constant parallel spaced relation to said path except at said direction changing portions, a rack supporting carriage, coupling means connecting the carriage to the conveyor for movement of the carriage by the conveyor without change in the orientation of the carriage relative to the frame, and guide means mounted by the carriage and engageable at all times with said pair of tracks for continuously guiding movement of the carriage.

References Cited

UNITED STATES PATENTS

| 2,603,547 | 7/1952 | Zook | 312—223 |
| 2,819,801 | 1/1958 | Winkler | 211—121 |
| 3,269,521 | 8/1966 | Briglia | 211—121 XR |
| 3,298,536 | 1/1967 | Zippel | 312—223 XR |

CHANCELLOR E. HARRIS, *Primary Examiner.*

W. D. LOULAN, *Assistant Examiner.*

U.S. Cl. X.R.

211—1.5